United States Patent
Hsieh

(10) Patent No.: US 7,092,571 B2
(45) Date of Patent: Aug. 15, 2006

(54) METHOD AND APPARATUS FOR REGIONAL IMAGE QUANTIFICATION VERIFICATION

(75) Inventor: Teh-Ming Hsieh, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 739 days.

(21) Appl. No.: 10/113,811

(22) Filed: Mar. 29, 2002

(65) Prior Publication Data

US 2003/0185462 A1    Oct. 2, 2003

(51) Int. Cl.
*G06K 9/62*    (2006.01)

(52) U.S. Cl. .................................................. 382/209

(58) Field of Classification Search ........ 382/141–154, 382/164, 181, 190, 209, 218, 219, 112; 250/599.05
See application file for complete search history.

(56) References Cited

U.S. PATENT DOCUMENTS

| | | | | |
|---|---|---|---|---|
| 5,579,471 A | * | 11/1996 | Barber et al. ............... | 715/700 |
| 5,719,631 A | * | 2/1998 | Pandel ................... | 375/240.15 |
| 5,890,808 A | * | 4/1999 | Neff et al. ................. | 382/209 |
| 5,973,738 A | * | 10/1999 | Srivastava ............... | 348/395.1 |
| 6,152,878 A | | 11/2000 | Nachtomy et al. .......... | 600/443 |
| 6,226,406 B1 | | 5/2001 | Hsieh ........................ | 382/209 |
| 6,493,705 B1 | * | 12/2002 | Kobayashi et al. ............ | 707/3 |
| 2002/0136468 A1 | * | 9/2002 | Sun ............................ | 382/305 |
| 2002/0168108 A1 | * | 11/2002 | Loui et al. ................... | 382/190 |
| 2002/0176622 A1 | * | 11/2002 | Watanabe et al. ........... | 382/165 |
| 2003/0152275 A1 | | 8/2003 | Chung et al. ............... | 382/218 |
| 2003/0185446 A1 | | 10/2003 | Huang et al. ............... | 382/218 |
| 2003/0185447 A1 | | 10/2003 | Huang et al. ............... | 382/218 |

OTHER PUBLICATIONS

Skovoroda et al., "Theoretical Analysis and Verification of Ultrasound Displacement and Strain Imaging", IEEE Transactions on Ultrasonics, Ferroelectrics, and Frequency Control, vol. 41, No. 3, May 1994, pp. 302-313.

* cited by examiner

*Primary Examiner*—Jingge Wu
*Assistant Examiner*—Yubin Hung
(74) *Attorney, Agent, or Firm*—Meyertons Hood Kivlin Kowert & Goetzel, P.C.; Jeffrey C. Hood

(57) ABSTRACT

A method and apparatus are disclosed for testing the accuracy of digital test images generated by a computer graphics program executed on a computer graphics system. A test program is utilized to compare a test image with a reference image. Regional image quantification verification aims at an image comparison test that accepts minor color value differences and spatial shifts in rendered pixel values. The test image and reference image are divided into corresponding sub-regions. The average color value for each sub-region of the test image is compared to the average color value of the corresponding reference image sub-region and also to other nearby reference image sub-regions. A test image is unacceptably different from a reference image, if for any sub-region of the test image, no reference image sub-region is found with an average color value difference and spatial shift less than specified maximums.

28 Claims, 7 Drawing Sheets

METHOD AND APPARATUS FOR REGIONAL IMAGE QUANTIFICATION VERIFICATION

BACKGROUND OF THE INVENTION

1. Field of the Invention

This invention relates generally to the field of computer software and computer program testing. More specifically, it relates to verification of graphics images produced by a computer graphics program.

2. Description of the Related Art

Early graphics systems were limited to two-dimensional (2D) graphics and acted as simple translators or interfaces to a display device. Modem graphics systems, however, must support three-dimensional (3D) graphics with textures and many special effects such as anti-aliasing, texture mapping, advanced shading, fogging, alpha-blending, and specular highlighting. Modem computer displays have many more pixels, greater color depth, and are able to display more complex images with higher refresh rates than earlier models. Consequently, modem graphics systems must incorporate graphics processors with a great deal of complexity, and the color value of one pixel can be the accumulated result of many calculations involving several models and mathematical approximations.

Software testing has experienced a similar transformation. As the complexity of the calculations and the layering of effects increased, the amount of time required to test and evaluate graphics software also increased and has become a significant bottleneck in the software development timeline. The evaluation of new graphics software may involve thousands of tests and require the judgment and experience of a senior test engineer to sort through the many possible reasons for a test failure. There may be more than one bug in a software program, and the cumulative result may cause a pixel in an output image to be different from a pixel in a reference image. In addition, there are many combinations and versions of hardware and software that may be used to generate a test image. It is not practical to generate a set of reference images for each of these combinations.

One method of testing graphics software is known as sample point testing. In this method the expected values of each pixel in a reference image generated by a specific hardware/software configuration is hardcoded in a test program. Each pixel of a test image is evaluated versus the hardcoded data in the test program. A difference image is formed by subtracting the value of a test image pixel from the value of the corresponding reference image pixel. Corresponding pixels are pixels located at the same x and y coordinates in both the test image and the reference image. Consequently, the test program user is easily overwhelmed, since the test evaluation output (the difference image) is as complex as the test image. In addition, the test program must be updated for any equipment or software modifications and each reference image requires a new test program. Maintaining and updating the test programs is both time consuming and error prone.

Other types of test programs are described in U.S. Pat. No. 6,226,406, issued on May 1, 2001, entitled "Method and Apparatus for Hybrid Sampling Image Verification" by Teh-Ming Hsieh.

A more efficient, faster, automated method of testing images generated on various combinations of computer graphics software and hardware using a limited set of reference images is needed. The method should accept insignificant rendering differences. The test result should be as simple as "pass or fail," or provide a simple quantifiable measurement of the image comparison. The comparison criteria should be user adjustable and programmable.

SUMMARY

The problems outlined above may, in some embodiments, be solved in part by limiting the number of reference images used for comparison in evaluating the accuracy of test images, by using a test program that renders only a pass or fail for a test image, and/or by relaxing the requirement that test image color values exactly match the color values in a reference image. Instead, test image color values that are within a user specified percentage of the average color value of a corresponding array of pixels in the reference image may be acceptable. In addition, the specified percentage can be tailored to fit the accuracy required for a given portion (or region) of the test image, or the rendering of a given object. In other embodiments, a test image is acceptable if there is an acceptable shift in corresponding pixel locations. This standard accepts a rendering process that shifts, enlarges, or shrinks an object within user specified limits. In still other embodiments, a user may define regions of interest with specific maximum differences for each region. This allows a user to specify the accuracy of certain regions of the test image as more critical than others and to focus a region on a particular object or group of objects with a narrow range of color values.

In some embodiments, the reference image may be an image generated by a known computer graphics program executed on a known computer graphics system. In another embodiment, the reference image may be generated by calculating the color values of each pixel. Equations describing the known transformations and lighting are applied to the known objects composing the image to determine the color value of each pixel. In still another embodiment, the reference image may be created by a combination of these two methods.

One embodiment of a test program identified herein as global image quantification verification may incorporate user-defined regions of interest with specific error tolerances for each region, and may generate one or more measurements of error or image difference for each region of the test image. Each region of the test image may be divided into sub-regions and an average color value may be calculated for each test image sub-region and the corresponding sub-region in the reference image. The absolute differences between the averages for the corresponding sub-regions in the test and reference images are calculated. A test image region may be unacceptably different from a reference image if a normalized sum of the absolute differences exceeds a user specified maximum difference. This method effectively blurs both the test image and the reference image.

Another embodiment of a test program for determining the accuracy of digital test images is identified herein as regional image quantification verification. This test program may incorporate user-defined regions of interest with specific error tolerances for each region and an image comparison that accepts minor color value and spatial shifts. Each region of the test image and reference image may be divided into sub-regions. The average color value for each sub-region of the test image may be compared to the average color value of the corresponding reference image sub-region and also to nearby reference image sub-regions. A test image region may be unacceptably different from a reference image if for any sub-region of the test image region, a reference image sub-region can not be found that has an average color value difference and spatial shift less than user specified maximums.

Still another embodiment of a test program for determining the accuracy of digital test images is identified herein as local image quantification verification. This test program may incorporate user-defined regions of interest with specific error tolerances for each region and may incorporate an image comparison that allows color value differences. Each pixel of a specified region of a test image may be compared to the corresponding pixel of a reference image, or to an average color value for a corresponding array of pixels in a reference image. If the color value of a test image pixel is within a specified difference from the color value of the corresponding reference image pixel, the test image pixel passes. If not, a larger array of pixels in the reference image is selected and the test is repeated. This sequence ends whenever the test image pixel passes, or when a specified maximum size array of reference image pixels is exceeded. A test image region may be unacceptably different from a reference image if for any pixel of the test image region, there is no corresponding reference image pixel or pixel array that has an array size or absolute color value difference less than or equal to user specified maximums. This method effectively blurs the reference image in progressive stages.

Yet still another embodiment of a test program for determining the accuracy of digital test images is identified herein as adaptive local image quantification verification. This test program may incorporate user-defined regions of interest with specific error tolerances for each region and may incorporate an image comparison that allows color value differences and spatial shifts. In addition to the process described for local image quantification verification, each pixel of a specified region of the test image may also be compared to the average color value of a corresponding, but possibly offset array of pixels in a reference image. A test image region may be unacceptably different from a reference image if for any pixel of the test image region, a reference image array can not be found that has an array size, absolute color value difference, and spatial shift less than user specified maximums.

BRIEF DESCRIPTION OF THE DRAWINGS

The foregoing, as well as other objects, features, and advantages of this invention may be more completely understood by reference to the following detailed description when read together with the accompanying drawings in which.

Figure 1:
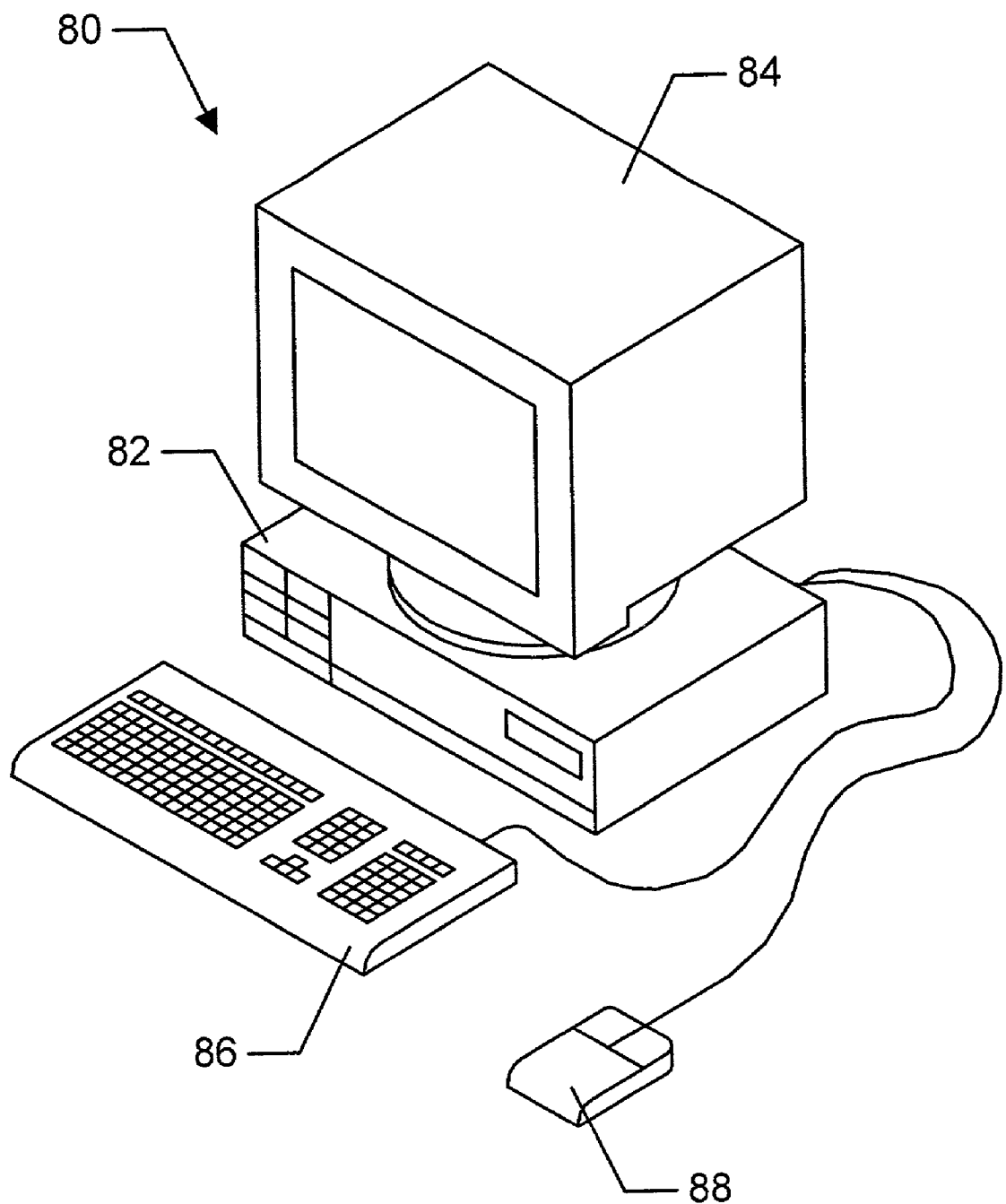
FIG. 1 depicts an example of a computer system capable of image quantification verification.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to." The term "connected" means "directly or indirectly connected", and the term "coupled" means "directly or indirectly connected".

DETAILED DESCRIPTION OF SEVERAL EMBODIMENTS

FIG. 1—Computer System

FIG. 1 illustrates one embodiment of a type of computer system 80 used to generate a test image and may also be configured to perform image quantification verification tests. The computer system 80 may be configured to include various devices, including a personal computer, a network PC, an Internet appliance, a television (including HDTV systems and interactive television systems), a personal digital assistant (PDAs), a virtual reality system, and other devices that display 2D and or 3D graphics, among others.

As shown, the computer system 80 includes a system unit 82 and a video monitor or display device 84 coupled to the system unit 82. The display device 84 may be any of various types of display monitors or devices (e.g., a CRT, LCD, or gas-plasma display). Various input devices may be connected to the computer system, including a keyboard 86 and/or a mouse 88, or other input device (e.g., a trackball, digitizer, tablet, six-degree of freedom input device, head tracker, eye tracker, data glove, or body sensors). Application software may be executed by the computer system 80 to display graphical objects on display device 84 or to perform image quantification verification tests.

Figure 2:
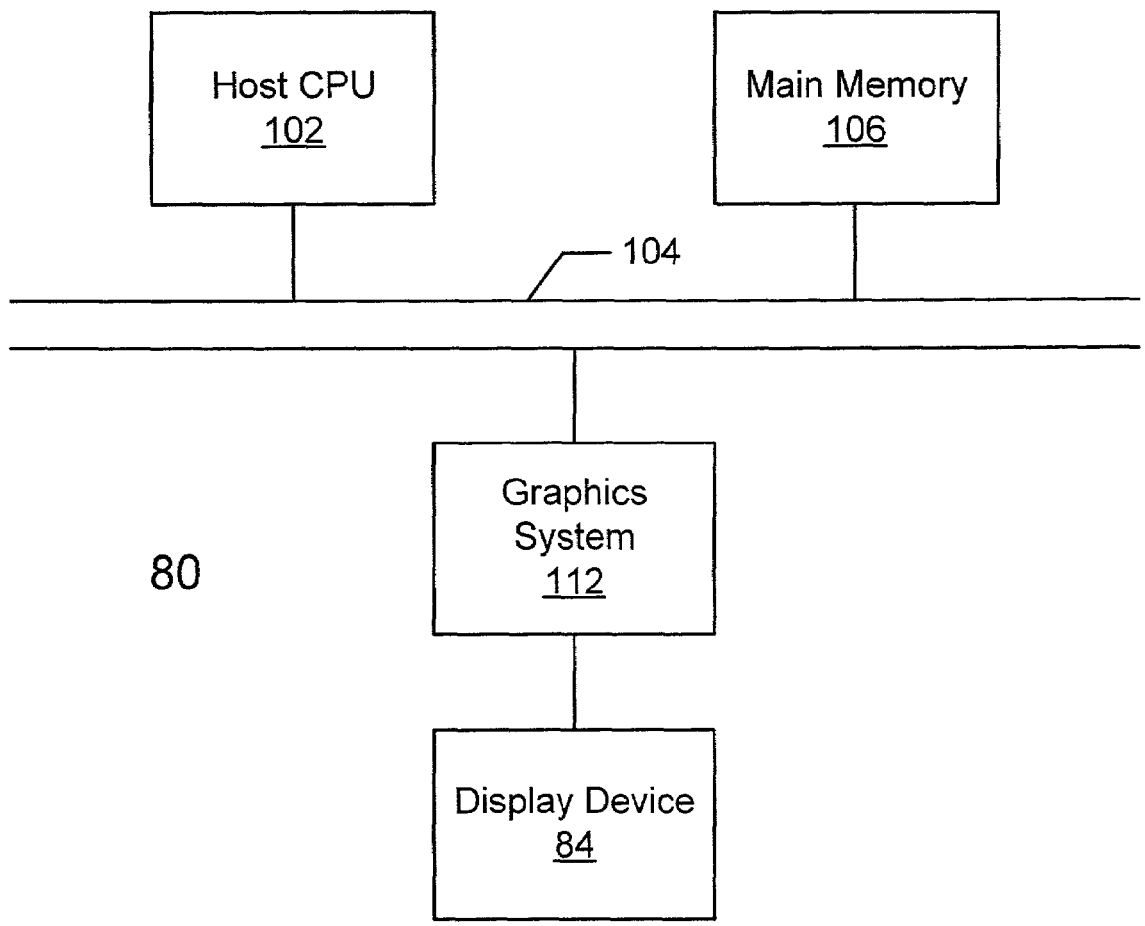
FIG. 2 is a simplified block diagram illustrating one embodiment of a computer system capable of image quantification verification.

FIG. 2—Computer System Block Diagram

FIG. 2 presents a simplified block diagram illustrating the computer system of FIG. 1. Elements of the computer system that are not necessary for an understanding of the present invention are not shown for convenience. As shown, the computer system 80 includes a host central processing unit (CPU) 102 coupled to a high-speed memory bus or system bus 104 also referred to as the host bus 104. A main memory 106 may also be coupled to high-speed bus 104.

Host CPU 102 may include one or more processors of varying types, e.g., microprocessors, multi-processors and CPUs. The main memory 106 may include any combination of different types of memory subsystems, including random access memories, (e.g., static random access memories or "SRAMs," synchronous dynamic random access memories or "SDRAMs," and Rambus dynamic random access memories or "RDRAM," among others) and mass storage devices. The system bus or host bus 104 may include one or more communication or host computer buses (for communication between host processors, CPUs, and memory subsystems) as well as specialized subsystem buses.

A graphics system 112 is coupled to the high-speed memory bus 104. The graphics system 112 may be coupled to the bus 104 by, for example, a crossbar switch or other bus connectivity logic. It is assumed that various other peripheral devices, or other buses, may be connected to the high-speed memory bus 104. It is noted that the graphics system may be coupled to one or more of the buses in computer system 80 and/or may be coupled to various types of buses. In addition, the graphics system may be coupled to a communication port and thereby directly receive graphics data from an external source, e.g., the Internet or a network. As shown in the figure, one or more display devices 84 may be connected to the graphics system 112 included in the computer system 80.

Host CPU 102 may transfer information to and from the graphics system 112 according to a programmed input/output (I/O) protocol over host bus 104. Alternately, graphics system 112 may access the main memory 106 according to a direct memory access (DMA) protocol or through intelligent bus mastering.

A graphics application program conforming to an application programming interface (API) such as OpenGL® or Java 3D™ may execute on host CPU 102 and generate commands and data that define a geometric primitive (graphics data) such as a polygon for output on display device 84. Host CPU 102 may transfer this graphics data to the main memory subsystem 106. Thereafter, the host CPU 102 may operate to transfer the graphics data to the graphics system 112 over the host bus 104. In another embodiment, the graphics system 112 may read in geometry data arrays over the host bus 104 using DMA access cycles. In yet another embodiment, the graphics system 112 may be coupled to the main memory 106 through a direct port, such as the Advanced Graphics Port (AGP) promulgated by Intel Corporation.

The graphics system may receive graphics data from any of various sources, including the host CPU 102 and/or the main memory 106, other memory, or from an external source such as a network, e.g., the Internet, or from a broadcast medium, e.g., television, or from other sources.

Note while graphics system 112 is depicted as part of computer system 80, graphics system 112 may also be configured as a stand-alone device (e.g., with its own built-in display). Graphics system 112 may also be configured as a single chip device or as part of a system-on-a-chip or a multi-chip module. Additionally, in some embodiments, certain elements of the illustrated graphics system 112 may be implemented in software.

Figure 3:
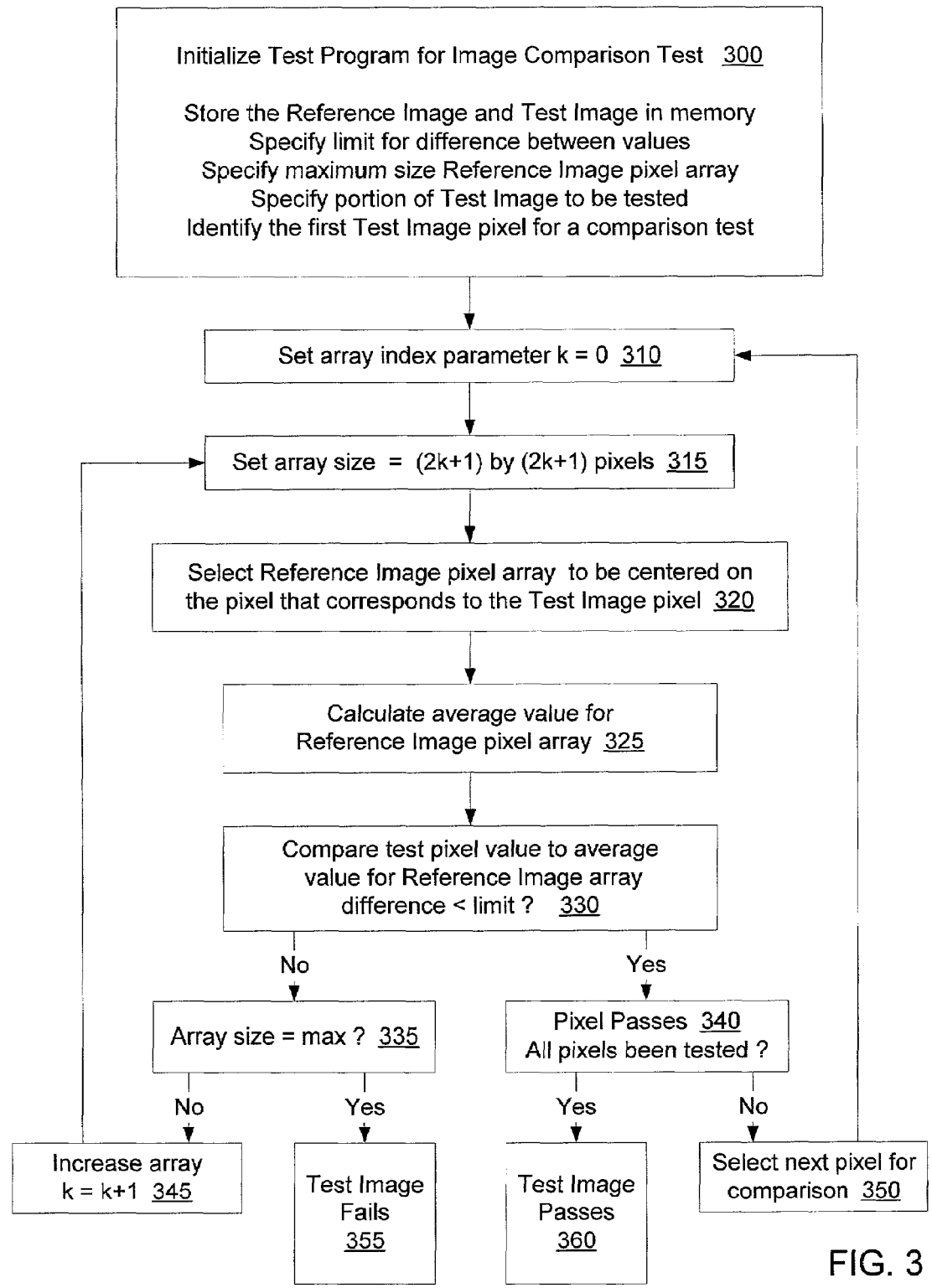
FIG. 3 is a flowchart of one embodiment of a method used to perform local image quantification verification.

FIG. 3—Local Image Quantification Verification

Local image quantification verification is a self-adaptive image comparison test program. In one embodiment, the user defines one or more regions of the test image to be individually compared to a reference image and restricts the comparison to those pixels that are within the specified region or regions. A region of the test image may also be specified as the combination of two or more disjoint regions. This allows the test comparison to focus on one object, a small group of objects, a set of common objects, or a region with some common characteristic, such as a sky color. By repeating the comparison for several different portions of the test image, a set of Pass/Fail results can be independently determined for different objects or regions.

The value of a test image pixel $T(x,y)$ is first compared to the value of the corresponding reference image pixel $R(x,y)$. Corresponding pixels are pixels located at the same x and y coordinates in image space, one each from the test image and the reference image. If the difference between the corresponding pixels is greater than a user specified limit (or maximum difference), the average value of an array of reference image pixels centered on the pixel $R(x,y)$ is compared to the value of the test image pixel. In other embodiments, the array of reference image pixels may not be centered on the pixel $R(x,y)$, but instead be offset and located near the pixel $R(x,y)$ and may or may not include the pixel $R(x,y)$. These methods effectively blur the reference image to identify an acceptable match.

FIG. 3 illustrates one set of embodiments of the local image quantification verification test program. The test program is first initialized 300 by storing the reference image and test image or by specifying where they may be accessed. Storing an image includes one or more steps of reading an image from a storage medium, receiving an image from the Internet or from an intranet, transferring a reference image from another computer system, or calculating a value for each pixel of a reference image from equations describing each graphics operation used to create the test image. In one embodiment of the test program, a batch of images may be stored, with one or more test images and one or more reference images. The user may specify which test image and reference image comparisons to perform. A limit (also referred to as a maximum percent difference, max %, or maximum difference) is specified for the difference between the value of the test image pixel and the corresponding value of a reference image pixel (or average value of a reference image pixel array). A limit or maximum size is also specified for a reference image pixel array. The portion (region or regions) of the test image to be evaluated is specified and the first test image pixel to be compared is selected.

The reference image array size may be controlled by an index parameter $k=0, 1, 2, 3, \ldots N$ and initially may be set equal to zero 310. The selected array of reference image pixels is $(2k+1)$ by $(2k+1)$. This selects one of the set of pixel arrays $\{1\times1, 3\times3, 5\times5, 7\times7, \ldots,$ maximum size array$\}$ 315. In some embodiments, the reference image array may be a rectangular array of pixels, a circular array of pixels, or a specified grouping of pixels. The reference image pixel array is selected so that it is centered on the pixel that corresponds to the position of the test image pixel 320. The average value of the reference image array is calculated 325 and compared to the value of the test image pixel 330. If the absolute difference is greater than the specified limit, and the array size is less than the maximum array 335, then k is increased by one 345 and the comparison is repeated for $k=k+1$ 315 through 330. If the absolute difference is greater than the specified limit, and the array size is equal to the maximum array 335 the test is terminated and the comparison is labeled a failure 355. If the absolute difference is less than the specified limit, the test pixel passes and the test program checks for untested pixels 340. If there is an untested pixel, a comparison is initiated 350. The array index parameter is re-set to zero 310 and the comparison process is repeated 315 through 330. If all pixels in the specified region of the test image have successfully passed the comparison test, the comparison is labeled a pass 360.

In some embodiments, the pass/fail test result generated by the test program is output to a printer, a display, or is stored in a memory. In other embodiments, the test program may be configured to test all pixels even if some pixels fail the comparison test. This may be of special interest in cases where only a few pixels had failed by a narrow margin. The percent differences in values for all pixels may be stored and statistics calculated to characterize the distribution of results within the test image. The output information may be expanded beyond a pass/fail criteria to a more detailed description of the pixels that failed or passed and the margin of failure individually or as a group. The output information may include one or more of the mean and variance of all absolute differences, a mean and variance of all acceptable absolute differences, a mean and variance of all unacceptable absolute differences, a maximum absolute difference, a minimum absolute difference and a range of absolute differences. This would give the user information on acceptable modifications of test parameter criteria that would enable the test image region to pass. In one embodiment, output information may include a histogram of differences, absolute differences, or % differences.

As used herein, the terms "array of pixels, array size, pixel array, and array" refer to one or more pixels, e.g., an array of pixels may include one pixel or may include a plurality of pixels. Where an array of pixels includes a single pixel, the average value of the array of pixels is the value of the single pixel.

As used herein, an average value of an array of pixels includes un-weighted averages or weighted averages. In some embodiments, the user may input a specific weighting function to be used to calculate weighting coefficients for each pixel position in the pixel array. Other weighting functions are possible and contemplated including functions with a radial dependence from a central pixel in an array, such as a conic function or a Gaussian function, and may include functions with both positively and negatively weighted regions.

As used herein, a "value" or a "color value" of a pixel may include any of various attribute values or other values of a pixel, including one or more of: color values (e.g., red, green, and/or blue; or hue, saturation, and/or intensity), gray scale value, or other values that may be used to form an image.

Figure 4:
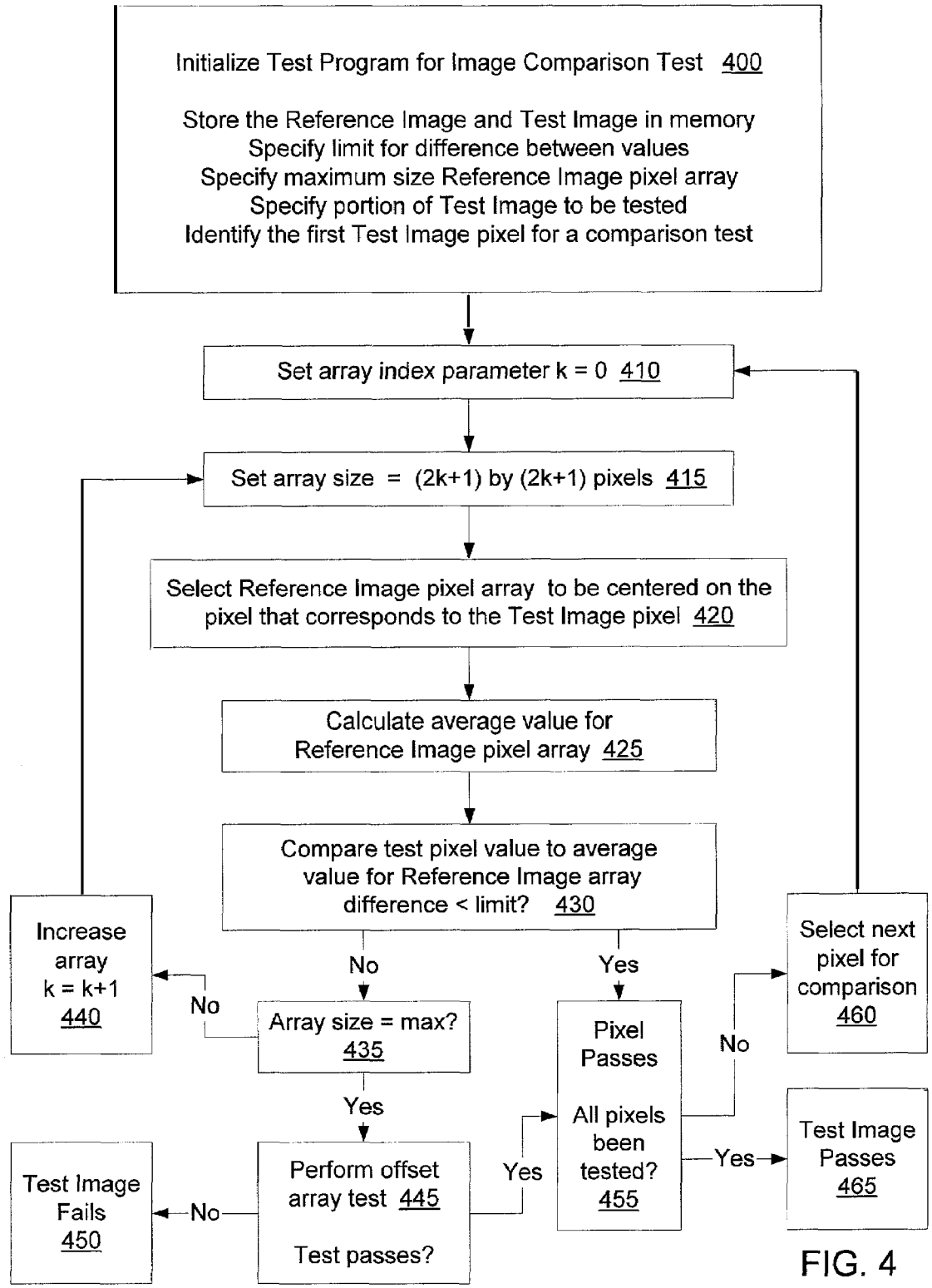
FIG. 4 is a flowchart of one embodiment of a method used to perform adaptive local image quantification verification.

FIG. 4—Adaptive Local Image Quantification Verification

Adaptive local image quantification verification is also a self-adaptive image comparison test program. In one embodiment, the user defines one or more regions (or portions) of the test image to be individually compared to a reference image and restricts the comparison to those pixels that are within the specified region or regions. A region of the test image may also be specified as the combination of two or more disjoint regions. This allows the test comparison to focus on one object, a small group of objects, a set of common objects, or a region with some common characteristic, such as a sky color. By repeating the comparison for several different regions of the test image, a set of Pass/Fail results can be independently determined for different objects or regions.

The value of a test image pixel $T(x,y)$ is first compared to the value of the corresponding reference image pixel $R(x,y)$. (A pixel in the test image and a pixel in the reference image are said to correspond if they are located at the same x and y coordinates in image space.) If the difference between the values of the corresponding pixels is greater than a user specified limit, the average value of an array of reference image pixels centered on the pixel $R(x,y)$ is compared to the value of the test image pixel $T(x,y)$. If the value difference is still too large, the average value of an offset (shifted) reference image pixel array is compared to the value of the test image pixel. This effectively blurs the reference image to identify an acceptable match, and may allow an object (or objects) to have a small shift in position or size as compared to the same object in the reference image. In some embodiments, the magnitude of an acceptable value difference and pixel offset may be specified by the user.

FIG. 4 illustrates one set of embodiments of the adaptive local image quantification verification test program. The test program is first initialized 400 by storing the reference image and test image or by specifying where they may be accessed. Storing an image includes one or more steps of reading an image from a storage medium, receiving an image from the Internet or from an intranet, transferring an image from another computer system, or calculating a value for each pixel of a reference image from equations describing each graphics operation used to create the test image. In one embodiment of the test program, a batch of images may be stored, with one or more test images and one or more reference images. The user may specify which test image and reference image comparisons to perform. A limit is specified for the maximum difference between the value of the test image pixel and the corresponding reference image pixel or pixel array. A limit is also specified for a maximum size reference image pixel array. The portion (region or regions) of the test image to be evaluated is specified and the first test image pixel to be compared is selected.

In some embodiments, the reference image array size may be controlled by an index parameter $k=0, 1, 2, 3, \ldots N$ and initially may be set equal to zero 410. The selected array of reference image pixels is $(2k+1)$ by $(2k+1)$. This selects one of the set of pixel arrays $\{1\times1, 3\times3, 5\times5, 7\times7, \ldots, \text{maximum array size}\}$ 415. In other embodiments, the reference image array may be a rectangular array of pixels, a circular array of pixels, or a specified grouping of pixels. The reference image pixel array is selected so that it is centered on the reference image pixel that corresponds to the position of the test image pixel 420. The average value of the reference image array is calculated 425 and compared to the value of the test image pixel 430. If the absolute difference is greater than the specified limit, and the array size is less than the maximum array 435, then k is increased by one 440 and the comparison is repeated for $k=k+1$ 415 through 430. If the absolute difference is greater than the specified limit, and the array size is equal to the maximum array 435 then an offset array test is performed to check for a shift in object position or size 445. If the offset array test also fails, the test is terminated and the comparison is labeled a failure 450. The offset array test is discussed in detail in the description of FIG. 5. If the absolute difference is less than the specified limit, the test pixel passes and the test program checks for untested pixels 455. If there remains an untested pixel, a next pixel is selected for comparison 460. The array index parameter is re-set to zero 410 and the comparison process is repeated 415 through 430. If all pixels in the specified portion (or region) of the test image have successfully passed the comparison test, the comparison is labeled a pass 465.

In one embodiment, the pass/fail test result generated by the test program is output to a printer, a display, or is stored in a memory. In other embodiments, the test program may be configured to test all pixels even if some pixels fail the comparison test. This may be of special interest in cases where only a few pixels had failed by a narrow margin. The percent differences in color values for all pixels may be stored and statistics calculated to characterize the distribution of results within the test image. The output information may be expanded beyond a pass/fail criterion to a more detailed description of the pixels that failed or passed and the margin of failure individually or as a group. The output information may include one or more of the mean and variance of all absolute differences, a mean and variance of all acceptable absolute differences, a mean and variance of all unacceptable absolute differences, a maximum absolute difference, a minimum absolute difference, a range of absolute differences, and a histogram of differences, absolute differences, or % differences. This would give the user information on acceptable modifications of test parameter criteria that would enable the test image region to pass.

Figure 5:
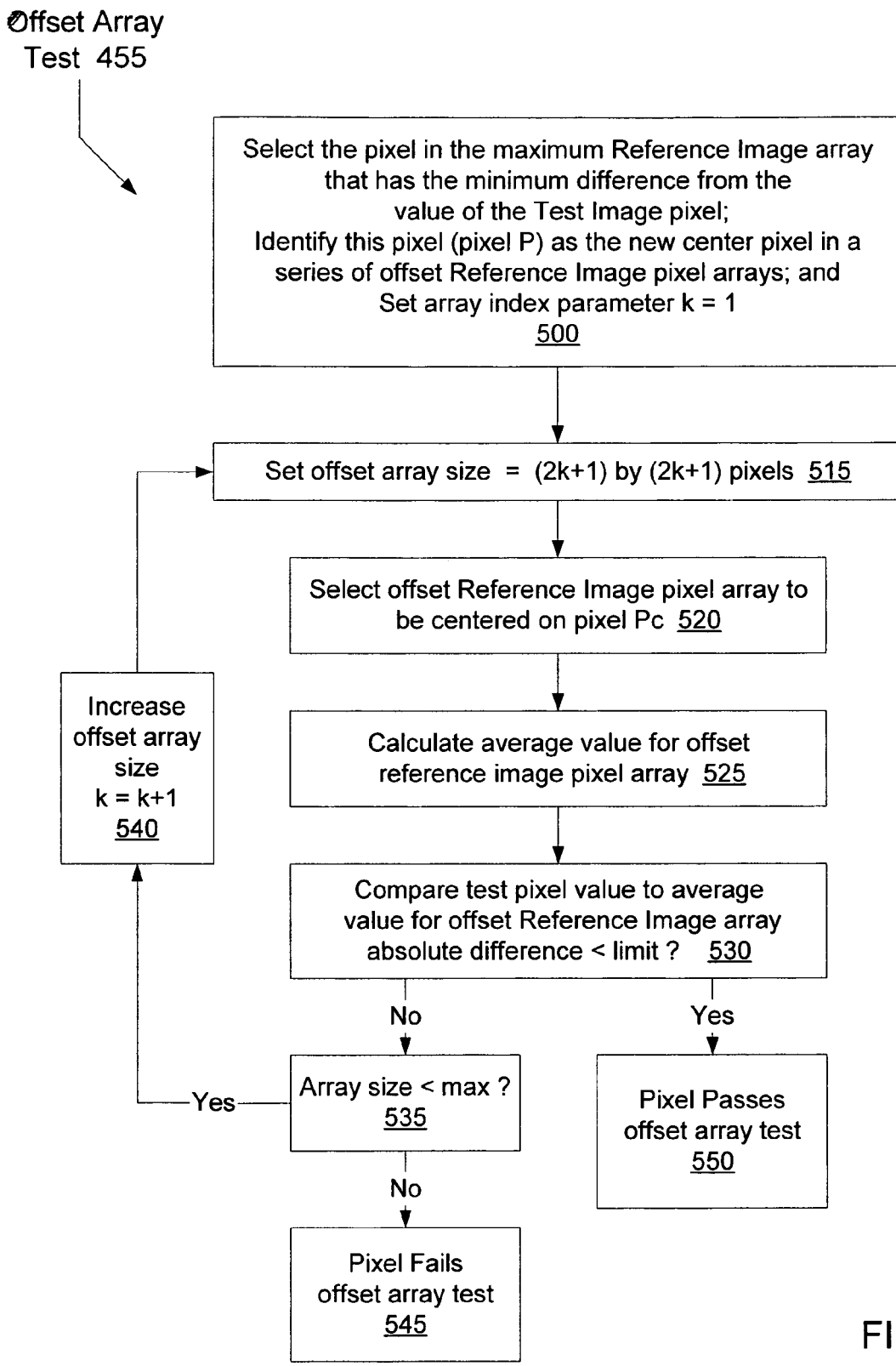
FIG. 5 is a flowchart of one embodiment of a method used to perform an offset array test as part of the method for adaptive local image quantification verification.

FIG. 5—Offset Array Test

FIG. 5 illustrates one embodiment of the offset array test for the adaptive local image quantification verification test program. The offset array test is first initialized 500 by selecting the pixel P within the maximum reference image array (i.e., a 2N+1 by 2N+1 array) that has the minimum difference from the value of the test image pixel. This pixel P will become the new center pixel for a series of offset reference image pixel arrays. The series of arrays begins with array index parameter k=1. The maximum difference and the maximum offset array size may be specified by the user or default to the values previously specified for the adaptive local image quantification verification test program.

The reference image offset array size is controlled by the index parameter k=1, 2, 3, . . . N. The selected array of reference image pixels is (2k+1) by (2k+1). This selects one of the set of pixel arrays {3×3, 5×5, 7×7, . . . maximum array size} 515. The offset reference image pixel array is selected so that it is centered on the pixel P that is offset from the pixel that corresponds to the position of the test image pixel 520. The average value of the offset reference image array is calculated 525 and compared to the value of the test image pixel 530. If the absolute difference is greater than the specified limit and the offset array size is less than the maximum array 535, then k is increased by one 540 and the comparison is repeated for k=k+1 515 through 530. If the absolute difference is greater than the specified limit and the offset array size is equal to the maximum offset array 535, then the test image pixel fails the offset array test 545. If the absolute difference is less than the specified limit, the test pixel passes the offset array test 550.

In other embodiments, the offset array test may be centered reference image pixels other than P. The test may use a different algorithm that searches for an offset reference image array that has an average value within a specified limit of the value of the test image pixel and is positioned within a specified distance from the reference image pixel that corresponds to the position of the test image pixel.

Figure 6:
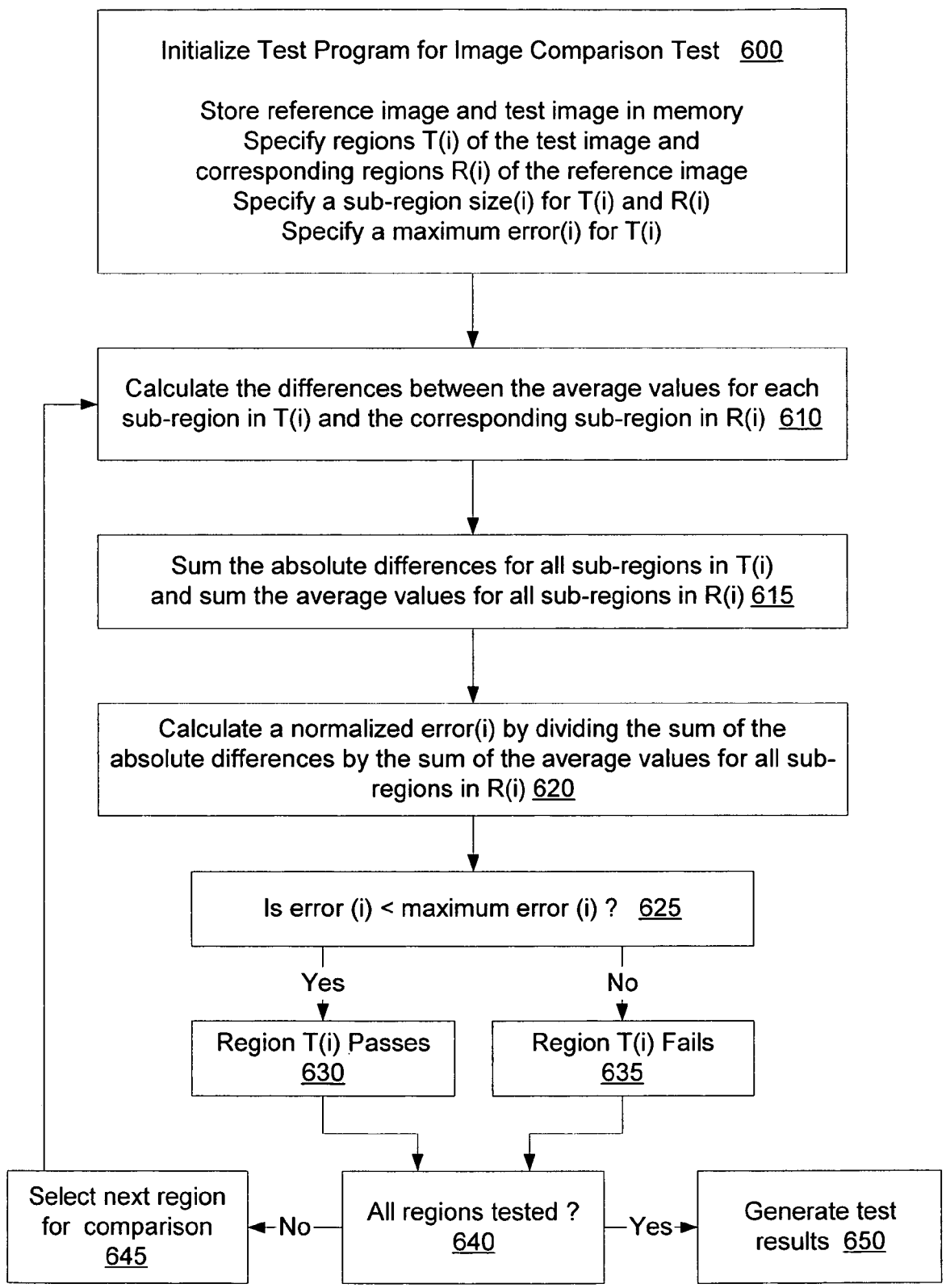
FIG. 6 is a flowchart of one embodiment of a method used to perform global image quantification verification.

FIG. 6—Global Image Quantification Verification

Another set of embodiments of a test program involves blurring both the test image and the reference image. Global image quantification verification incorporates user-defined regions of interest with a specified error tolerance for each region. The user may specify certain regions as more important than others and focus a region on a particular object or group of objects. Global image quantification verification aims at a higher-level image comparison by generating one measurement of error or image difference for an entire region of the test image. Each region of the test image and the reference image is divided into sub-regions and an average value is calculated for each test image sub-region and the corresponding sub-region in the reference image. The differences between the averages for corresponding sub-regions in the test and reference images are calculated. A test image region may be unacceptably different from a reference image if a normalized sum of the absolute differences exceeds a user specified maximum error.

FIG. 6 illustrates one set of embodiments of a global image quantification verification test program. The test program is first initialized 600 by storing a reference image and test image or by specifying where they may be accessed. Storing an image includes one or more steps of reading an image from a storage medium, receiving an image from the Internet or an intranet, transferring an image from another computer system, or calculating a value for each pixel of a reference image from equations describing each graphics operation used to create the test image. In some embodiments of the test program, a batch of images may be stored, with one or more test images and one or more reference images. The user may specify which test image and reference image comparisons to perform. In some embodiments, the user specifies a region of the test image, a corresponding region of the reference image, a size for all of a plurality of sub-regions within the specified regions, and a maximum error. The user may specify a region by describing the individual pixels, a block of pixels, or multiple blocks of pixels that are contained in the region. The user (or a software designer) may specify a sub-region size, e.g., by choosing a pixel array or a block of pixels and/or by entering a size through a user interface. In some embodiments, the sub-regions of a region are all the same size and form a grid across the extent of the region. In other embodiments, the user specifies multiple regions T(i) of the test image, corresponding regions R(i) of the reference image, and a size for all of a plurality of subregions within each T(i) and R(i). In some embodiments, a different size may be specified for each sub-region within a specific region. The one or more test image regions, when combined, may form a portion or all of the test image pixels. The user may also specify a maximum error(i) for each region T(i).

The test program calculates the difference between the average of the values of all pixels in a sub-region of T(i) and the average of the values of all pixels in a corresponding sub-region of R(i) 610. The test program then calculates the sum of the absolute differences for all sub-regions in T(i) and also calculates the sum of the average values for all sub-regions in R(i) 615. A normalized error(i) for region T(i) is calculated, e.g., by dividing the sum of the absolute differences for all sub-regions in T(i) by the sum of the average values for all sub-regions in R(i) 620. The normalized error(i) for region T(i) is then compared with the specified maximum error(i) 625. The test image region T(i) passes if error(i) is less than the specified maximum error(i) 630, and fails if error(i) is more than the specified maximum error(i) 635. If multiple regions have been specified, the test program checks for untested regions 640, and initiates, if needed, a new error calculation for another region 645. When all specified regions have been tested, the test program generates test results for each tested region 650.

In some embodiments, the test result generated may be a simple pass or fail output to any of various devices including a display, a printer, or storage medium. In other embodiments, generating a test result may include calculating and reporting statistics on the comparison that may allow the user to better interpret why the test image failed or to alter the test criteria. Test results for a test image region, may include one or more of a mean and variance of all absolute differences between respective averages for corresponding sub-regions in the test image region and the reference image region, a mean and variance of all absolute differences less than a specified threshold, a mean and variance of all absolute differences greater than a specified threshold, a list of the sub-region differences that exceeded the specified maximum error, a maximum absolute difference, a minimum absolute difference, a range of absolute differences, and a histogram of the sub-region differences. In still other embodiments, the test program may store the differences calculated for each sub-region and the statistics for all sub-regions within a test image region.

Figure 7:
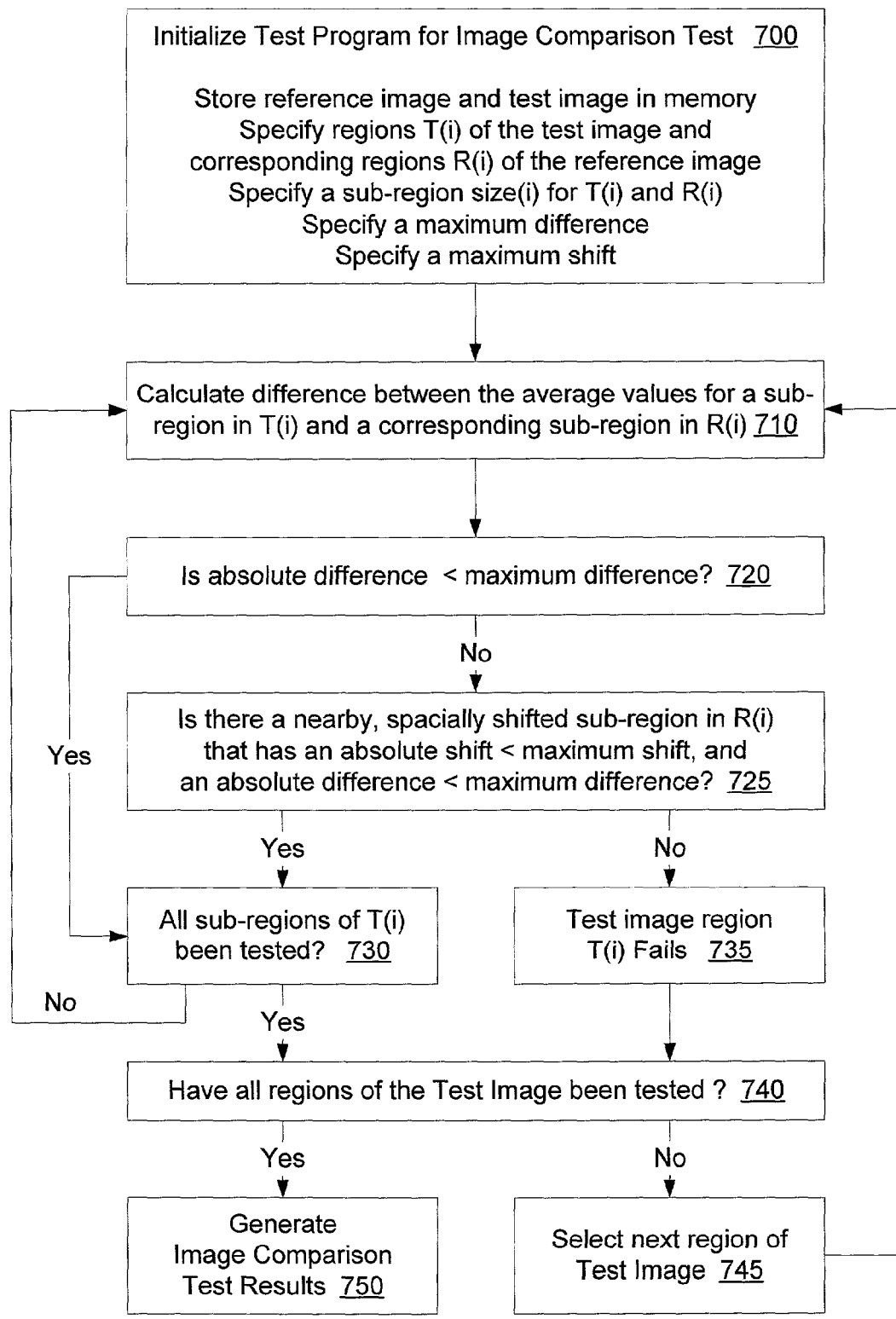
FIG. 7 is a flowchart of one embodiment of a method used to perform regional image quantification verification.

FIG. 7—Regional Image Quantification Verification

Another set of embodiments of a test program involves blurring both the test image and the reference image and also allows for objects in the test image to be shifted in position or size relative to the same object in the reference image. Regional image quantification verification therefore aims at an image comparison that accepts minor pixel value differences and spatial shifts. One embodiment of the test program incorporates user-defined regions of interest with specified error tolerances for each region. This allows the user to specify certain regions as more important than others and to focus a region on a particular object or group of objects. Each region of the test image and reference image may be divided into sub-regions. The average value for each sub-region of the test image is compared to the average value of the corresponding reference image sub-region and also to nearby reference image sub-regions. A test image region may be unacceptably different from a corresponding reference image region, if for any one subregion of the test image region, a reference image sub-region can not be found that has an average value difference and spatial shift less than user specified maximums.

FIG. 7 illustrates one set of embodiments of a regional image quantification verification test program. The test program is first initialized 700 by storing a reference image and test image or by specifying where they may be accessed. Storing an image includes one or more steps of reading an image from a storage medium, receiving an image from the Internet or from an intranet, transferring an image from another computer system, or calculating a value for each pixel of a reference image from equations describing each graphics operation used to create the test image. In one embodiment of the test program, a batch of images may be stored, with one or more test images and one or more reference images. The user may specify which test image and reference image comparisons to perform. In some embodiments, the user specifies a region of the test image, a corresponding region of the reference image, a size for all of a plurality of sub-regions within the specified regions, and a maximum difference. The user may specify a region by describing the individual pixels, a block of pixels, or multiple blocks of pixels that are contained in the region. The user (or a software designer) may specify a sub-region size, e.g., by choosing a pixel array or a block of pixels and/or by entering a size through a user interface. In other embodiments, the user specifies multiple regions T(i) of the test image, corresponding regions R(i) of the reference image, and a size for all of a plurality of sub-regions within each T(i) and R(i). In some embodiments, a different size may be specified for each sub-region within a specific region. The user may also specify a maximum difference for each region T(i). The one or more test image regions, when combined, may form a portion or all of the test image pixels.

The test program calculates the difference between the average of the values of all pixels in a sub-region of T(i) and the average of the values of all pixels in a corresponding sub-region of R(i) 710. The test program compares the absolute difference with the specified maximum difference 720. The test image sub-region passes if the absolute difference is less than the maximum difference and if there are sub-regions of T(i) that remain untested, a new sub-region is tested 730. If the absolute difference is greater than the maximum difference, the test program searches the reference image for a shifted sub-region that has an absolute spatial shift less than the specified maximum shift and an absolute difference less than the maximum difference 725. As used herein, a spatial shift is the distance in image space between the center of the shifted reference image sub-region and the center of the reference image sub-region that corresponds in x and y position in image space to the x and y position of the center of the test image sub-region. If a shifted sub-region of the reference image that meets these criteria is found, the test image sub-region passes, and if there are sub-regions of T(i) that remain untested, a new sub-region is then tested 730. In some embodiments, if a reference image sub-region that meets these criteria is not found the test image sub-region fails and consequently, the test image region T(i) fails 735. In other embodiments, all test image sub-regions are evaluated and the differences and shifts are stored for analysis and included in the test results for each region. If multiple regions have been specified, the test program checks for untested regions 740. If there are any untested regions remaining, a new region T(i+1) is selected 745 and the testing continues for the new region 710–735. When all regions have been tested, the test program generates test results for each tested region 750.

In some embodiments, the test result generated may be a simple pass or fail and may be output to various devices including a display, a printer, or storage medium. In other embodiments, generating a test result may include calculating and reporting statistics on the comparison that may allow the user to better interpret why the test image failed or to alter the test criteria. Test results for a test image region, may include one or more of a mean and variance of all absolute differences between respective averages for corresponding sub-regions in the test image region and the reference image region, a mean and variance of all absolute differences less than a specified difference, a mean and variance of all absolute differences greater than a specified difference, a list of the sub-regions with differences that exceeded the specified maximum difference, a maximum absolute difference and shift, a minimum absolute difference and shift, a range of absolute differences and shifts, a histogram of differences, and a histogram of shifts. In still other embodiments, the test program may store the differences and shifts determined for each sub-region and the statistics for all sub-regions within a test image region.

Although the embodiments above have been described in considerable detail, other embodiments are possible and contemplated. Numerous variations and modifications will become apparent to those skilled in the art once the above disclosure is fully appreciated. It is intended that the following claims be interpreted to embrace all such variations and modifications. Note the headings used herein are for organizational purposes only and are not meant to limit the description provided herein or the claims attached hereto.

What is claimed is:

1. A method of determining variations of a test image with respect to a reference image, the method comprising:
    a) storing the reference image in a memory, wherein the reference image comprises a plurality of pixels, wherein each of the pixels comprises at least one value;
    b) storing the test image in a memory, wherein the test image comprises a plurality of pixels, wherein each of the pixels comprises at least one value;
    c) specifying one or more regions in the test image and corresponding regions in the reference image;
    d) specifying a plurality of sub-regions for each test image region and a plurality of corresponding sub-regions in the corresponding reference image region;

e) calculating an average of the values of the pixels in each of the sub-regions in a test image region and the corresponding reference image region;

f) calculating differences between the average values for respective corresponding sub-regions in the test image region and the corresponding reference image region;

g) comparing the absolute difference calculated for a test image sub-region to a specified maximum difference, and wherein, if the absolute difference is greater than the maximum difference, searching for a shifted sub-region of the reference image region that has an absolute difference with the test image sub-region that is less than the maximum difference and which has an absolute shift less than a specified maximum shift; and h) generating a test result indicative of the variations of the test image with respect to the reference image in the specified regions, wherein generating a test result for a region comprises generating a test result of FAIL if any sub-region in the test image region has an absolute difference greater than the maximum difference and there is no shifted sub-region that has an absolute spatial shift less than a specified maximum shift and an absolute difference less than the maximum difference.

2. The method of claim 1, further comprising repeating step g) for one or more additional sub-regions in a test image region, and repeating steps e), f), and g) for each test image region.

3. The method of claim 2, wherein repeating step g) stops if no sub-region of the reference image can be found that has an absolute difference with the test image sub-region less than the maximum difference and an absolute shift less than the maximum shift.

4. The method of claim 1, wherein generating a test result for a region comprises generating a test result of PASS if the absolute differences for all sub-regions in the test image region are less than a specified maximum difference or there is a shifted sub-region that has an absolute spatial shift less than the specified maximum shift and an absolute difference less than the specified maximum difference.

5. The method of claim 1, wherein said maximum shift comprises a specified maximum shift for each region of the test image.

6. The method of claim 5, further comprising receiving user input to specify a maximum shift for each region.

7. The method of claim 1, wherein said maximum difference comprises a specified maximum difference for each region of the test image.

8. The method of claim 7, further comprising receiving user input to specify a maximum difference for each region.

9. The method of claim 1, wherein storing a reference image comprises one or more of reading a reference image from a storage medium, transferring a reference image from another computer system or computer network, or calculating a value for each pixel of a reference image from equations describing each graphics operation used to create the test image.

10. The method of claim 1, wherein, for each of the test image and the reference image, said at least one ,value for a pixel comprises one or more color values, a gray scale value, or other values that are used to form an image.

11. The method of claim 1, wherein for each of the test image and the reference image, said at least one value for a pixel comprises one or more color values of red, green, blue, hue, saturation, and intensity.

12. The method of claim 1, wherein specifying one or more regions further comprises receiving user input to specify the specific pixels included in each region.

13. The method of claim 1, wherein specifying sub-regions further comprises specifying a sub-region size for each corresponding region of the test image and the reference image.

14. The method of claim 13, wherein specifying a sub-region size, further comprises receiving user input to specify a pixel array for the sub-region size.

15. The method of claim 1, wherein said one or more regions combined form a portion of the test image that contain a plurality of pixels or all of the test image pixels.

16. The method of claim 1, wherein generating a test result further comprises calculating, for each test image region, one or more of a mean and variance of all absolute differences between respective corresponding sub-regions in the test image region and the reference image region, a mean and variance of all absolute differences less than the maximum difference, a mean and variance of all absolute differences greater than the maximum difference, a mean and variance of all spatial shifts, a maximum absolute difference and shift, a minimum absolute difference and shift, a range of absolute differences and shifts, and a histogram of differences and shifts or absolute differences and shifts.

17. The method of claim 16, further comprising storing said differences and shifts for all test image sub-regions.

18. The method of claim 1, wherein generating a test result further comprises one or more of displaying, printing, and storing the test result.

19. A memory medium, comprising:

program instructions for determining variations of a user provided test image with respect to a user provided reference image, wherein the reference image comprises a plurality of pixels, wherein each of the pixels comprises at least one value, wherein the test image comprises a plurality of pixels, wherein each of the pixels comprises at least one value, and wherein the program instructions are executable to implement:

a) specifying one or more regions in the test image and corresponding regions in the reference image;

b) specifying a plurality of sub-regions for each test image region and a plurality of corresponding sub-regions in the corresponding reference image region;

c) calculating an average of the values of the pixels in each of the sub-regions in a test image region and a corresponding reference image region;

d) calculating differences between the average values for respective corresponding sub-regions in a test image region and the corresponding reference image region;

e) comparing the absolute difference calculated for each of one or more test image sub-regions to a specified maximum difference, and if one of said one or more test image sub-regions has an absolute difference greater than the maximum difference, then further searching for a shifted sub-region of the reference image region that has an absolute difference with the test image sub-region that is less than the maximum difference and which has an absolute shift less than a specified maximum;

f) repeating steps c), d), and e) for all test image regions; and g) generating a test result indicative of the variations of the test image regions with respect to the corresponding reference image regions, wherein generating a test result for a region comprises generating a test result of FAIL if any sub-region in the test image region has an absolute difference greater than the maximum difference and there is no shifted subregion that has an absolute spatial shift less than a specified maximum shift and an absolute difference less than the maximum difference.

20. The memory medium of claim 19, wherein a reference image is one or more reference images, a test image is one or more test images, and program instructions are executable to implement selecting one or more of the reference images for comparison to a test image.

21. The memory medium of claim 19, further comprising test results.

22. A system for determining variations of a test image with respect to a reference image, the system comprising:
   a memory medium that stores:
      the reference image, wherein the reference image comprises a plurality of pixels, wherein each of the pixels comprises at least one value;
      the test image, wherein the test image comprises a plurality of pixels, wherein each of the pixels comprises at least one value; and
      a software program executable to determine variations of the test image with respect to the reference image; and
   a processor coupled to the memory medium, wherein the processor is operable to execute the software program to implement:
   a) specifying one or more regions in the test image and corresponding regions in the reference image;
   b) specifying a plurality of sub-regions for each test image region and a plurality of corresponding sub-regions in the corresponding reference image region;
   c) calculating an average of the values of the pixels in each of the sub-regions in a test image region and a corresponding reference image region;
   d) calculating differences between the average values for respective corresponding sub-regions in a test image region and the corresponding reference image region;
   e) comparing the absolute difference calculated for each of one or more test image sub-regions to a specified maximum difference, and if one of said one or more test image sub-regions has an absolute difference greater than the maximum difference, then further searching for a shifted sub-region of the reference image region that has an absolute difference with the test image sub-region that is less than the maximum difference and which has an absolute shift less than a specified maximum shift;
   f) repeating steps c), d), and e) for all test image regions; and
   g) generating a test result indicative of the variations of the test image regions with respect to the corresponding reference image regions, wherein generating a test result for a region comprises generating a test result of FAIL if any sub-region in the test image region has an absolute difference greater than the maximum difference and there is no shifted sub-region that has an absolute spatial shift less than a specified maximum shift and an absolute difference less than the maximum difference.

23. The system of claim 22, further comprising one or more display devices for displaying the test result.

24. The system of claim 22, further comprising one or more input devices for entering data.

25. The system of claim 22, further comprising a memory medium that stores the test results.

26. A method for comparing a test image and a reference image, the method comprising:

(a) computing a first average for pixels in a sub-region of a region of the test image;
(b) computing a second average for pixels in a corresponding sub-region of the reference image;
(c) testing the sub-region of the test image region, wherein said testing comprises:
   (c1) repeating (a), (b) and (c) for any remaining sub-regions of the test image region if the first average and the second average are sufficiently close;
   (c2) searching among shifted sub-regions of the reference image if the first average and the second average are not sufficiently close, wherein said searching comprises:
      (c2-1) examining a first of said shifted sub-regions of the reference image, wherein said examining comprises:
         (c2-1-1) computing a third average for pixels in the first shifted sub-region;
         (c2-1-2) conditionally repeating (a), (b) and (c) for a next untested sub-region of the test image region in response to determining that the first average and the third average are substantially close, if there are any remaining, as yet not tested, sub-regions of the test image region;
         (c2-1-3) conditionally repeating (c2-1) for a next unexamined one of said shifted sub-regions in response to determining that the first average and third average are not substantially close, if there are any remaining, as yet not examined, shifted sub-regions;
      (c2-2) conditionally asserting an output indicating dissimilarity of the test image region with respect to the corresponding region of the reference image if none of the shifted sub-regions have a third average substantially close to the first average.

27. A method for comparing a test image and a reference image, the method comprising:
   (a) computing a first average for pixels in a sub-region of a region of the test image;
   (b) computing a second average for pixels in a corresponding sub-region of the reference image;
   (c) testing the sub-region of the test image region, wherein said testing comprises:
      (c1) repeating (a), (b) and (c) for any remaining sub-regions of the test image region if the first average and the second average are sufficiently close;
      (c2) searching among shifted sub-regions of the reference image if the first average and the second average are not sufficiently close, wherein said searching comprises:
         (c2-1) conditionally asserting an output indicating dissimilarity of the test image region with respect to the corresponding region of the reference image if none of the shifted sub-regions have a pixel average substantially close to the first average;
         (c2-2) repeating (a), (b) and (c) for a next untested sub-region of the test image region in response to determining that one of the shifted sub-regions has a pixel average substantially close to the first average.

28. A method of determining variations of a test image with respect to a reference image, the method comprising:
   a) storing the reference image in a memory, wherein the reference image comprises a plurality of pixels, wherein each of the pixels comprises at least one value;

b) storing the test image in a memory, wherein the test image comprises a plurality of pixels, wherein each of the pixels comprises at least one value;
c) specifying one or more regions in the test image and corresponding regions in the reference image;
d) specifying a plurality of sub-regions for each test image region and a plurality of corresponding sub-regions in the corresponding reference image region;
e) calculating an average of the values of the pixels in each of the sub-regions in a test image region and the corresponding reference image region;
f) calculating differences between the average values for respective corresponding sub-regions in the test image region and the corresponding reference image region;
g) comparing the absolute difference calculated for a test image sub-region to a specified maximum difference, and wherein, if the absolute difference is greater than the maximum difference, searching for a shifted sub-region of the reference image region that has an absolute difference with the test image sub-region that is less than the maximum difference and which has an absolute shift less than a specified maximum shift; and
h) generating a test result indicative of the variations of the test image with respect to the reference image in the specified regions, wherein generating a test result for a region comprises generating a test result of PASS if the absolute differences for all sub-regions in the test image region are less than a specified maximum difference or there is a shifted sub-region that has an absolute spatial shift less than the specified maximum shift and an absolute difference less than the specified maximum difference.

* * * * *

UNITED STATES PATENT AND TRADEMARK OFFICE
CERTIFICATE OF CORRECTION

PATENT NO. : 7,092,571 B2  Page 1 of 1
APPLICATION NO. : 10/113811
DATED : August 15, 2006
INVENTOR(S) : The-Ming Hsieh It is certified that error appears in the above-identified patent and that said Letters Patent is hereby corrected as shown below:

In the Claims:

Column 13
Line 58, please delete "at least one, value for" and substitute
-- at least one value for --;

Column 14
Lines 5 - 6, please delete "a sub-region size, further comprises" and substitute
-- a sub-region size further comprises --.

Signed and Sealed this

Twenty-eighth Day of November, 2006

JON W. DUDAS
*Director of the United States Patent and Trademark Office*